Jan. 27, 1931. F. ROBBINS 1,790,074

INSTRUMENT FOR OBTAINING DYNAMICALLY SYMMETRICAL RATIOS

Filed Oct. 10, 1925

Inventor.
Ford Robbins.
By Whiteley and Ruckman
Attorneys.

Patented Jan. 27, 1931

1,790,074

UNITED STATES PATENT OFFICE

FORD ROBBINS, OF MINNEAPOLIS, MINNESOTA, ASSIGNOR TO FORD ROBBINS, INCORPORATED, OF MINNEAPOLIS, MINNESOTA, A CORPORATION

INSTRUMENT FOR OBTAINING DYNAMICALLY-SYMMETRICAL RATIOS

Application filed October 10, 1925. Serial No. 61,809.

My invention relates to instruments for obtaining dynamically symmetrical ratios. An object of the invention is to provide an instrument by means of which proportionally balanced space divisions in their work may be readily obtained by architects, engineers, designers, landscape gardeners, and all other draftsmen. I accomplished the objects of my invention by providing an instrument by means of which various rectangles may be laid off whose sides bear a square root relationship to their ends and also by means of which rectangles may be laid out in which the sides and ends have a ratio of 1.618 to 1.

The full objects and advantages of my invention will appear in connection with the detailed description thereof and the novel features embodied in my inventive idea will be particularly pointed out in the claims.

Figure 1:
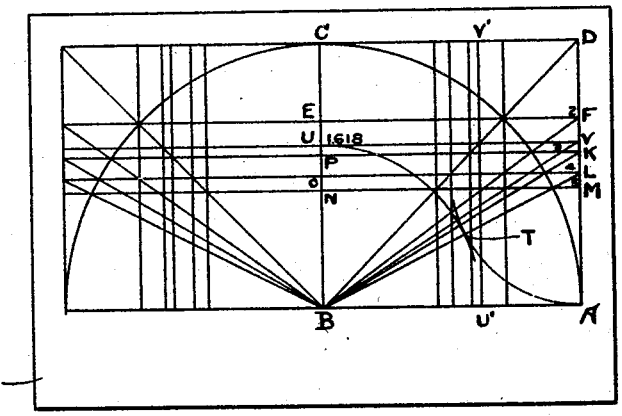
Figure 2:
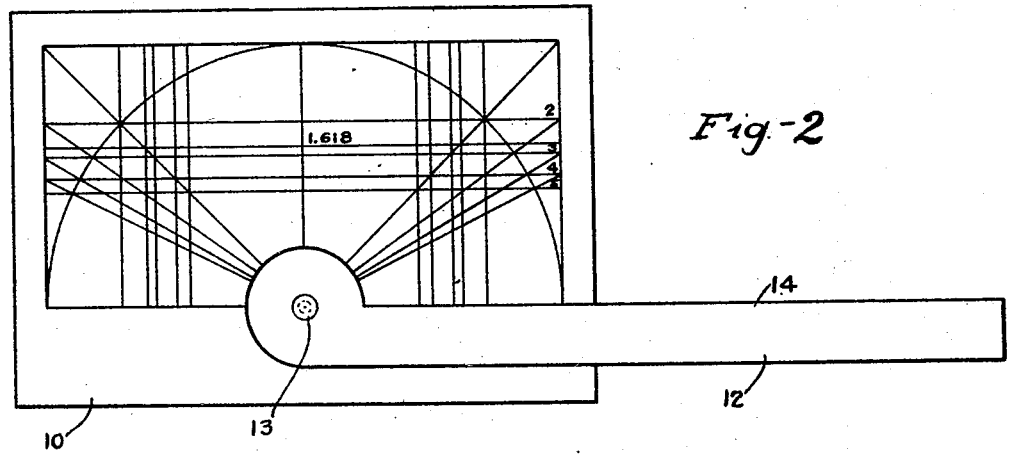
Figure 3:
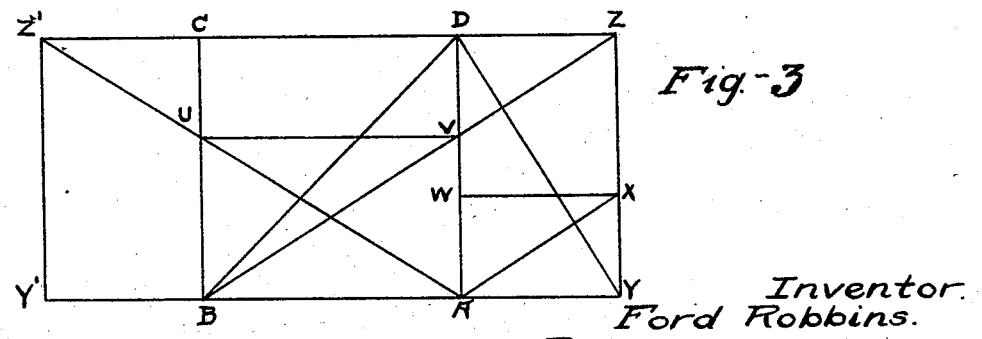

Fig. 1 is a diagrammatic view showing the manner of constructing a 1.618 rectangle. Fig. 2 is a plan view of a preferred form of the completed instrument. Fig. 3 is a diagrammatic view showing the manner of laying off the reciprocal of a 1.618 rectangle.

Referring to the drawings, the numeral 10 designates a carrying member which preferably consists of a rectangular strip of sheet-like material such as cardboard or celluloid.

Fig. 1 shows the method of obtaining what may be referred to as a mean and extreme ratio rectangle. On the line LB, a distance LT is laid off from L equal to LA and on the line BC a distance BU is laid off from B equal to BT. Through the point U a line UV is drawn parallel to the base line BA and a rectangle ABUV is produced in which from the rule relating to mean and extreme ratios, we know that the length of the line UV is 1.618 when the line VA is taken as 1. This rectangle may be referred to as a 1.618 rectangle, the reciprocal of which is .618. In Fig. 3, a 1.618 rectangle ABUV has been drawn in the square ABCD and the diagonal BV is extended to meet the extended line CD at the point Z. From the point Z a line ZY parallel to VA is drawn to meet the extended line BA at Y. We then have two right angle triangles ADY and AUV which are equal to each other since the angles are equal and AD equals UV. Hence AY and VA are equal. The line AX may be readily drawn parallel to the line BZ and from X the line XW is drawn parallel to AY. We therefore have a rectangle AWXY from which by comparison with the rectangle ABUV we have the following proportion:

$$UV:VA::AY:XY$$

Substituting the known quantities in this proportion, we have $1.618:1::1:XY$ or $$XY = \frac{1}{1.618} = .618$$

In the rectangle ADZY, it will be seen that we have a square WDZX and the reciprocal of a 1.618 rectangle placed side by side. Referring to the same figure, the diagonal AU is continued until it meets the extended line CD at the point Z' and the line Z'Y' is drawn parallel to the line BC to meet the extended line AB at the point Y'. Since the right angle triangles AUV and AZ'D are similar, we have the following proportion:

$$UV:VA::DZ':DA$$

The rectangle ADZ'Y' therefore has the same proportion as the rectangle ABUV and is a 1.618 rectangle and the equal rectangle BCZY is another 1.618 rectangle. The rectangles BCZ'Y' and ADZY are the reciprocals and hence DZ and CZ' have a value of .618. Hence in the rectangle ZZ'Y'Y the side ZZ' is .618 plus 1 plus .618 which equals 2.236, which is equal to $$\sqrt{5}$$

and this rectangle is a root 5 rectangle since $ZY=1$. In this figure, we have two 1.618 rectangles BCZY and ADZ'Y' with their squares superimposed from which it is observed that it is unnecessary to proceed further in the series than the root 5 rectangle.

Fig. 2 is a plan view showing the carrying member 10 upon which the lines and rectangles previously determined have been drawn. It is obvious that the carrying member may be used for laying out rectangles proportional to those indicated thereon by means of any straight edge which is placed to pass through the point B and through any one of the points F, V, K, L and M or other points on the margin of either of the two squares. However, for practical use, I prefer to attach an arm 12 to the carrying member 10. This arm is pivotally attached by a rivet 13 at the point B and has a straight edge 14 which always passes through the point B and can be made to pass through any one of the points on either of the two squares. One manner of using the device will be understood from Fig. 3 assuming that a 1.618 rectangle is to be drawn adjacent the right hand portion of the rectangle ABCD. The arm 12 of the device is turned on its pivot 13 so that the straight edge 14 passes through the point V indicated in Fig. 1. The device thus set is placed with the pivot 13 directly over the point B and with the base line AB of the device directly over the line AB of the rectangle. This, of course can be readily done when the device is constructed of transparent celluloid. The point where the straight edge 14 crosses the line CD extended is marked at Z, and upon completing the rectangle ADZY, it will be found to be a 1.618 rectangle. A root 2 rectangle may be similarly drawn by placing the straight edge 14 so as to extend through the point F, a root 3 rectangle may be similarly drawn by placing the straight edge so as to extend through the point K, a root 4 rectangle may be similarly drawn by placing the straight edge so as to extend through the point L, while a root 5 rectangle may be similarly drawn by placing the straight edge so as to extend through the point M. In order to draw a 1.618 rectangle adjacent the left hand portion of the rectangle ABCD, the straight edge 14 is placed so as to extend through the left hand point corresponding to the point V and the pivot 13 is then placed directly over the point A. The procedure previously set forth is repeated to determine the rectangle BCZ'Y'. The root rectangles above referred to may also be laid out at the left in similar manner.

I claim:

1. An instrument for obtaining dynamically symmetrical ratios comprising a rectangular sheet having two equal squares marked thereon with one side in common, an arm pivoted to said sheet at a common corner of said squares, said arm having a straight edge which is directed through the pivotal point for all positions of the arm around the pivotal point, and predetermined indicating points located at intervals along those sides of said squares which are remote from the pivotal point, said indicating points being so disposed that root rectangles may be laid out by drawing lines along said straight edge when said straight edge passes through the one of said points which corresponds to the desired rectangle.

2. An instrument for obtaining dynamically symmetrical ratios comprising a rectangular sheet having two equal squares marked thereon with one side in common, an arm pivoted to said sheet at a common corner of said squares, said arm having a straight edge which is directed through the pivotal point for all positions of the arm around the pivotal point, and predetermined indicating points located at intervals along those sides of said squares which are remote from the pivotal point, said indicating points being so disposed that root rectangles and a 1.618 rectangle may be laid out by drawing lines along said straight edge when said straight edge passes through the one of said points which corresponds to the desired rectangle.

In testimony whereof I hereunto affix my signature.

FORD ROBBINS.